United States Patent [19]
Fulmer et al.

[11] 3,977,854
[45] Aug. 31, 1976

[54] APPARATUS FOR AND METHOD OF COATING GLASS FIBERS
[75] Inventors: Ray M. Fulmer; Raymond L. Lochlear, Jr., both of Aiken, S.C.
[73] Assignee: Owens-Corning Fiberglas Corporation, Toledo, Ohio
[22] Filed: June 10, 1974
[21] Appl. No.: 477,880

Related U.S. Application Data
[62] Division of Ser. No. 263,369, June 7, 1972, abandoned.

[52] U.S. Cl. .................. 65/3 R; 65/11 W; 118/63; 118/68; 427/348
[51] Int. Cl.² ........................................ C03B 37/02
[58] Field of Search ............ 65/3, 11 W, 2; 118/63, 118/68, 234; 117/102 A, 119, 126 GQ, 102 L; 427/348, 350, 352

[56] References Cited
UNITED STATES PATENTS

| | | | |
|---|---|---|---|
| 2,373,078 | 4/1945 | Kleist | 117/126 GQ |
| 2,911,941 | 11/1959 | Sokal | 65/3 X |
| 3,029,161 | 4/1962 | Ferner | 427/350 |
| 3,117,888 | 1/1964 | Fox | 117/126 GQ |
| 3,222,149 | 12/1965 | Drummond | 65/3 |
| 3,304,163 | 2/1967 | Holschlag | 65/2 X |
| 3,314,162 | 4/1967 | Haywood | 118/68 X |
| 3,507,250 | 4/1970 | Dew | 118/234 |
| 3,556,755 | 1/1971 | Dent | 65/11 W |
| 3,666,431 | 5/1972 | Oswald | 65/11 W |
| 3,681,039 | 8/1972 | Marzocchi | 117/102 L |

Primary Examiner—Robert L. Lindsay, Jr.
Attorney, Agent, or Firm—John W. Overman; Ronald C. Hudgens; K. H. Wetmore

[57] ABSTRACT

Apparatus for and method of producing glass strand including withdrawing spaced apart continuous glass filaments from streams of molten glass; advancing the filaments along converging paths to a gathering member, the advancing filaments moving air with them; applying a coating substance to the filaments; gathering the filaments into a strand; and removing any excess coating substance from the strand by diverting at least some of the moving air to flow generally transversely across the path of the advancing strand.

7 Claims, 11 Drawing Figures

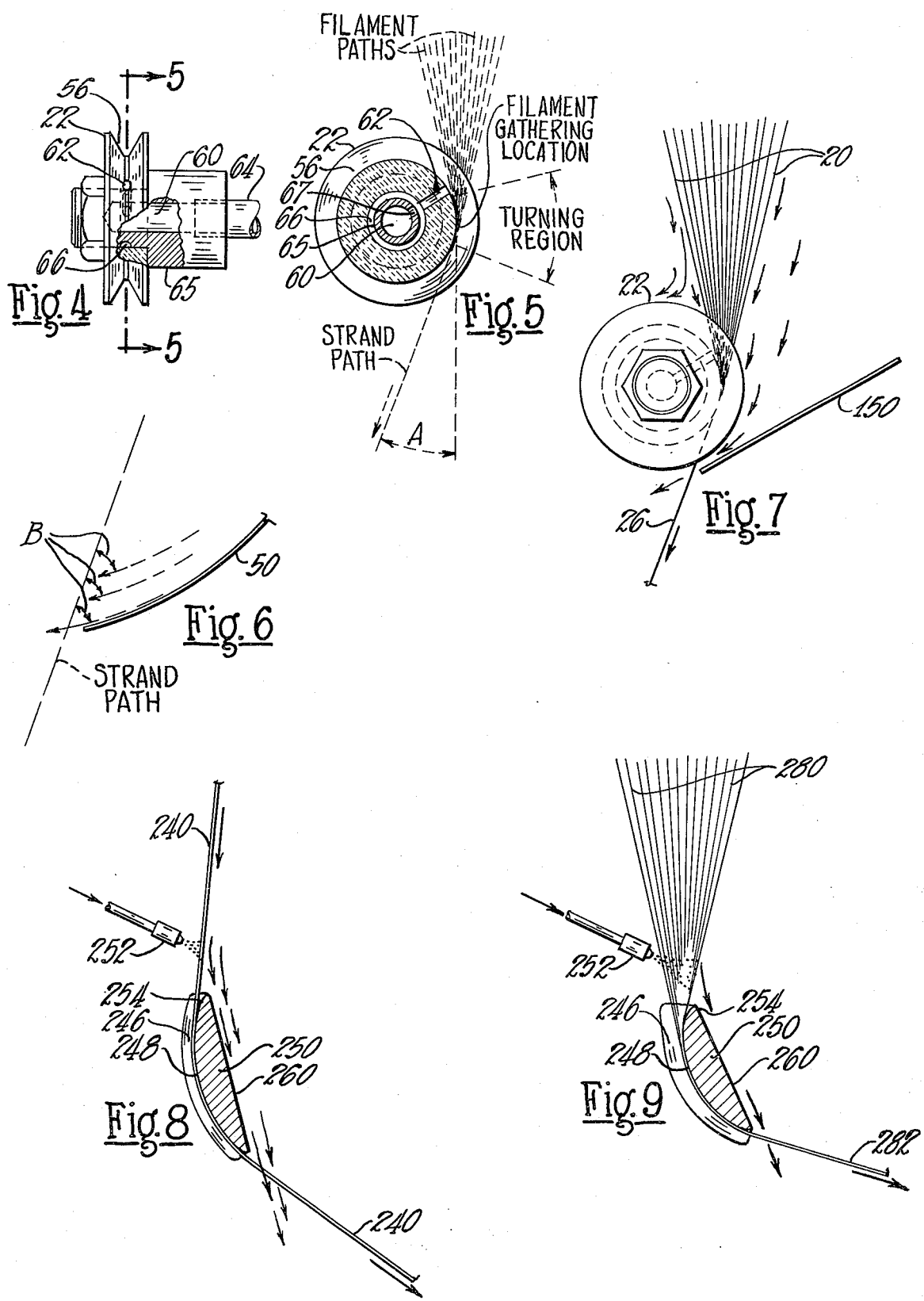

APPARATUS FOR AND METHOD OF COATING GLASS FIBERS

This is a division of application Ser. No. 263,369, filed June 7, 1972 now abandoned.

BACKGROUND OF THE INVENTION

Continuous glass filaments are normally made in high speed filament forming operations. In these operations filaments can be drawn at linear speeds in the order of 5,000 to 15,000 feet-per-minute and faster.

In the usual glass filament forming operation filaments are withdrawn from streams flowing from a source of molten glass. The speeding filaments are gathered into a strand that is forwarded to a collection zone. And it is common practice to collect the strand into a wound package by a winder. Also, a rotary pulley device, such as a "pull wheel, " can advance the strand to a collection surface to form a mat.

The high linear velocities of the continuous filaments draw a considerable amount of air from the surrounding atmosphere in the direction of filament travel. In fact, the high processing speeds induce such a flow of air that the speeding filaments and strand might be considered an air pump.

The energy of the large quantities of air moving with the filaments in filament forming operations makes treatment of filaments with coating substances difficult.

Yet in processes producing glass strand it is a practice to apply a liquid sizing a individual glass filaments before they are combined into the strand. The sizing protects the glass filaments from abrasion by each other and unites the filaments into an integral bundle.

But prior liquid applying apparatus does not closely control the amount of sizing liquid applied to the filaments. Energy of air moving with the filaments plays a large part in nonuniform treatment of the filaments. To overcome nonuniform treatment difficulties prior methods normally apply excess liquid to avoid strand locations that might otherwise have insufficient liquid on them. Consequently, in filament forming processes collected glass strand normally has excess liquid unevenly applied alone its length.

Subsequent drying of excessively wet wound strand packages is a long process that causes migration of solids in the sizing or other liquid as liquid moves towards the periphery of packages for evaporation. Such movement of liquid tends to concentrate solids along the strand portions located near the periphery of packages. Hence, strands from these packages possess varying amounts of solids along their length; strand properties are not uniform. Accordingly, these strands are not wholly satisfactory.

Of course, increased processing speeds increases air flow with the filaments. Hence, in processes forming continuous glass filaments air flow has a significant effect on processing speeds. This is especially true for treatment of the filaments with special coating substances.

SUMMARY OF THE INVENTION

An object of the invention is improved apparatus for and method of treating linear material with a coating substance.

Another object of the invention is improved apparatus for and method of removing excess coating substance from multifilament linear material.

Still another object of the invention is improved apparatus for and method of applying a coating substance to multifilament linear material.

Yet another object of the invention is improved apparatus for and method of impregnating multifilament linear material.

Still yet another object of the invention is improved apparatus for and method of producing glass strand.

These and other objects are attained by using the energy of fluid media, such as air, moved by advancing linear material to remove any excess coating substance therefrom. At least a portion of the media moved by the linear material is directed from its path to move generally transversely across the path of the material to remove any excess coating substance therefrom.

The invention also embraces the use of the fluid media moved by advancing multifilament linear material to improve impregnation of the material. At least a portion of the fluid media moved by the material is directed generally transversely of the filament paths as the filaments with a coating substance applied are being gathered into a bundle. Further, the invention embraces an improved applicator that applies coating substance as it gathers filaments into a bundle.

Other objects and advantages of the invention will become apparent as the invention is described hereinafter in more detail with references made to the accompanying drawings.

DESCRIPTION OF THE DRAWINGS

FIG. 4 is an enlarged side elevation view of the gathering member that is an element of the treatment assembly. The member both gathers filaments into a strand and applies a liquid to the filaments just before the filaments are gathered into the strand.

FIG. 5 is an enlarged front elevation view in section of the gathering member shown in FIG. 4. The section is taken along the lines 5—5 shown in FIG. 4.

FIg. 6 indicates air flow across the strand path from the gathering member shown in FIGS. 4 and 5.

FIG. 7 is another embodiment of apparatus according to the principles of the invention.

FIG. 8 is still another embodiment of apparatus according to the principles of the invention.

FIG. 9 shows the apparatus of FIG. 8 treating continuous glass treating filaments and gathering them into a bundle.

DESCRIPTION OF THE PREFERRED EMBODIMENTS

The method and apparatus of the invention are particularly useful in processes of forming filaments of heat-softened mineral material such as molten glass. In these processes apparatus combines wet individual glass filaments into an untwisted filament bundle or glass strand that is wound into a package. But the method and apparatus of the invention are useful in other processes that treat other types of linear material (for example, filament bundles such as yarn, cord, roving, etc., as well as monofilaments) made from glass or other filament forming material such as nylon and polyester. Hence, the disclosure of treating and packaging glass strand in a glass filament forming operation is only an example to explain the operation of the invention. And the term linear material used in the specification and claims includes monofilaments and bundles, including bundles of continuous or discontinuous synthetic filaments with or without twist, in addition to bundles of natural filaments.

Figures 1, 2, 3:
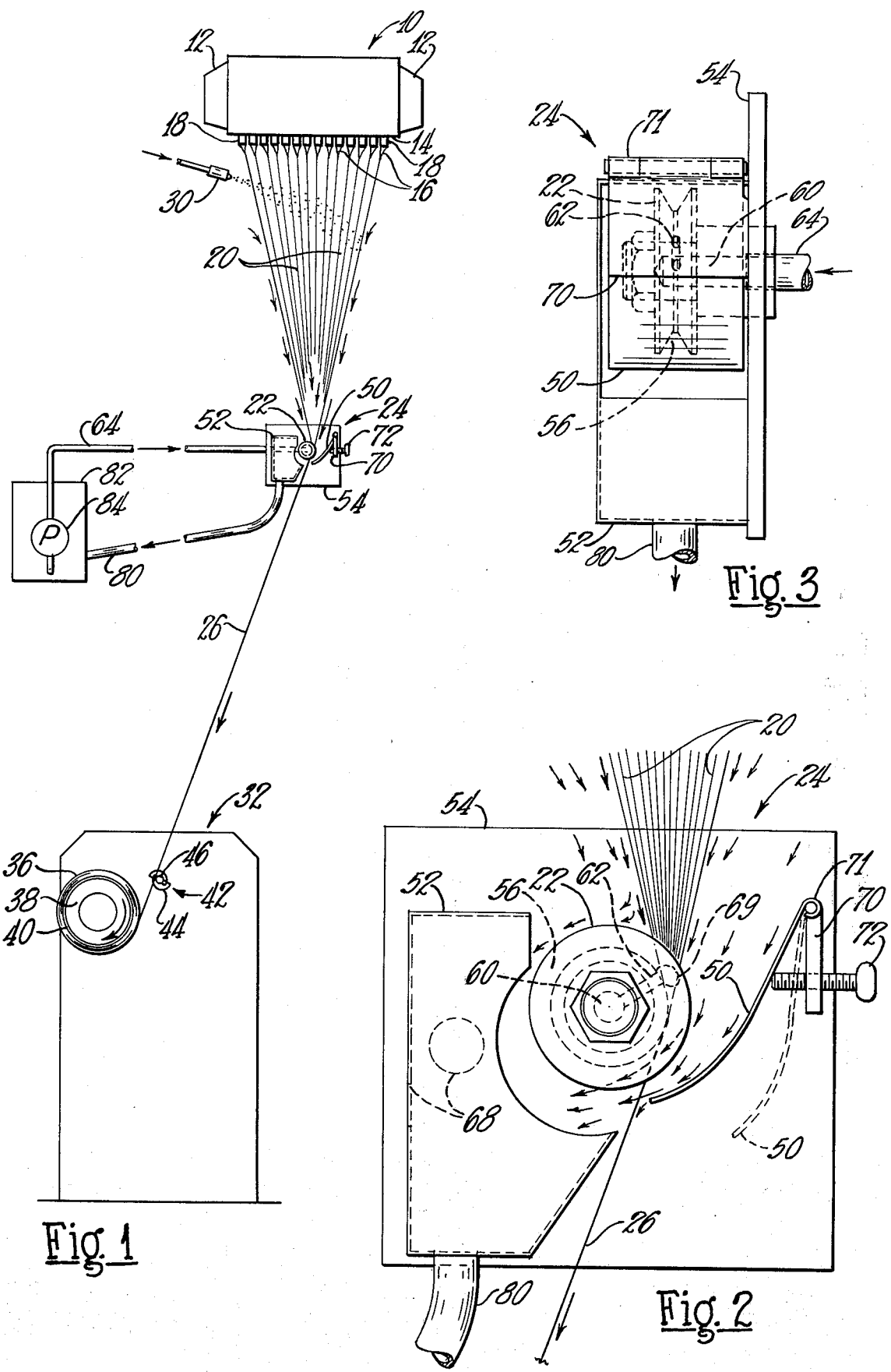
FIG. 1 is a front elevation view of apparatus according to the principles of the invention in a glass filament forming operation.
FIG. 2 is an enlarged front elevation showing of a liquid treatment assembly that is a component of the apparatus shown in FIG. 1.
FIG. 3 is a side elevation view of the treatment assembly shown in FIG. 2.

FIG. 1 shows a process of forming continuous glass filaments. Apparatus treats the glass filaments with a liquid and combines them into an untwisted filament bundle or strand that collects as a wound package. As illustrated, a container 10 holds a supply of molten glass. The container 10 may connect to a forehearth that supplies molten glass from a furnace or may connect to another means for supplying glass, such as marbles that are reduced to a heat-softened condition in a melter associated with the container 10. Terminals 12 are on the end of the container 10. These terminals 12 connect to a source of electrical energy to supply heat by conventional resistance heating to glass held in the container 10 to maintain the glass at proper fiber forming temperatures and viscosities.

The container 10 has a bottom wall 14 including orifices or passageways for delivering streams 16 of molten glass from the container 10. As shown in FIG. 1 the openings in the bottom wall 14 comprises rows of spaced apart depending orificed projections or tubular members 18.

The molten streams 16 are attenuated into individual spaced apart continuous glass filaments 20 advancing lengthwise downwardly together at high linear speeds along converging paths to a filament gathering member 22 of a treatment assembly 24 located below the container 10. The movement of the filaments draws a considerable amount of air with them from the surrounding atmosphere. The arrows in FIG. 1 generally indicate the air flow downwardly.

The filaments 20 turn or bend upon the member 22 to form a strand 26. Normally apparatus supplies both water and a coating substance, such as a conventional liquid sizing, to the filaments 20. As shown, a nozzle 30 adjacent to the bottom wall 14 of the feeder 10 directs water spray onto the advancing continuous glass filaments 20 before the member 22 combines them into the strand 26.

The treating assembly 24 applies a quantity of coating liquid to the advancing filaments before the filaments are gathered into the strand 26. Moreover, the assembly is effective in removing any excess coating liquid from the strand 26 by flowing at least a portion of the air moved by the filaments 20 generally transversely across the path of the strand 26.

The coating liquid applied to the filaments 20 can be any useful liquid, e.g. dispersions such as latices and plastisols or polymeric material in solvents in addition to conventional starch sizings.

A winder 32 collects the treated strand 26 as a wound package 36 on a driven rotatable collet or mandral 38. The package 36 forms on a collector such as a tube 40 telescoped onto the collect 38.

Advancement of the strand 26 downwardly to the package 36 during collet rotation attenuates the glass streams 16 into the continuous glass filaments 20.

Strand transversing apparatus 42 moves the advancing strand 26 back and forth axially of the collet 38 (package 36) to distribute the strand 26 on the package 36. In the embodiment shown the traversing apparatus 42 includes a "spiral wire" 44 on a driven shaft 46. U.S. Pat. No. 2,391,870 described the operation of a "spiral wire" tranverse arrangement.

The speeding filaments 20 move air from the surrounding atmosphere at high speeds in their general direction of travel. This air flow is not fully understood, although the flow is considered to be complex turbulent flow.

A thin film of air from the surrounding atmosphere, known as a boundary layer, adheres to the surface of each of the individual speeding filaments 20. A boundary layer surrounds each of the filaments 20; air in the boundary layer moves in the direction of filament travel. And there is a velocity gradient within each of the layers. Air moves within each of the layers at faster speeds in regions nearer the surface of the filaments. At the surface of each of the filaments 20 air is drawn at substantially filament speed. And the filaments 20 can be drawn by the winder 32 at linear speeds up to 10,000 to 15,000 feet per minute and faster. Hence, some of the air moving in the boundary layer travels at high velocities.

Near the bottom wall 14 of the container 10 the boundary layers on newly formed filaments 20 are exceedingly thin, perhaps a filament diameter or so. But the layers increase in thickness as the newly formed filaments 20 speed to the gathering member 22. The boundary layers may become many filament diameters thick as the filaments race to the treatment assembly 24.

Air in the boundary layers merges as the speeding filaments 20 come closer together along their paths to the gathering member 22. And the merged air of the boundary layers forms a body of air moving with considerable energy.

Air movement in the boundary layers establishes reduced atmospheric pressure within the group of filaments advancing from the streams 16 to the gathering member 22. Hence, air from the surrounding atmosphere is drawn into the region of filament travel. This entrained air movement is believed to augment air flow moved generally in the direction of filament travel.

The converging filaments 20 may also, in a sense, "squeeze" air as the distance between filaments becomes less to effect a greater "pumping" of air towards the gathering shoe 22 with advancing filaments 20.

The transverse cross section of the channel or region of air flowing downwardly to the member 22 is large in comparison to the cross section of the strand 26. The diameter of a filament bundle like strand 26 is normally less than ⅝ of an inch in diameter. But the diameter of the region or air flow can be many inches in diameter, e.g. 8 to 10 inches in diameter or more. The higher velocity air tends to be nearer the filaments 20.

The treatment asembly 24 applies liquid to the advancing filaments 20 and uses air moved by the filaments 20 to separate or remove any excess or unwanted liquid from the filaments 20, which are shown combined into the strand 26.

The treatment assembly 24 is more clearly seen in FIGS. 2 and 3. In the embodiment shown the assembly 24 includes the gathering member 22, a movably mounted air deflector plate 50 and a liquid receiving receptical or container 52. A mounting member 54 carries these components.

The gathering member 22 is used both to combine the filaments 20 into the strand 26 and to apply liquid to the filaments 20. Referring to FIGS. 2–5, it can be seen that the member 22 as shown is a short hollow cylinder or disc that has a circular recess or groove 56 in its circumferential surface. The groove 56 is generally V-shaped. The member 22 has an internal cavity or chamber 60 that communicates with groove 56 through a passageway 62. The passageway 62 is aligned with the converging filaments 20 immediately above their gathering point on the member 22. Gathering members of other shapes can be used.

A supply tube 64 carries liquid under pressure to the cavity 60. Referring more specifically to FIGS. 4 and 5, it can be seen that the supply tube has a step down portion 65 that extends through the member 22. The portion 65 is smaller than the interior hollow of the member 22; an annular space 66 is formed between the portion 65 and the member 22. An opening 67 through the wall of the portion 65 connects the chamber 60 with the annular space 66 and the passageway 62.

In a glass filament forming operation the member 22 is normally made of graphite composition to reduce abrasion of the glass filaments.

The filaments 20 pass across the member 22 to turn in the groove 56 to form the strand 26. Hence, the converging traveling filaments 20 are gathered into the strand 26 in the groove 56. FIG. 5 indicates a turning region for the filaments in the groove 56. And as indicated in FIG. 5 the strand 26 leaves the member 22 along a path forming an angle A with the vertical. Normally angle A is from 15° to 20° for a glass filament forming operation a shown in FIG. 5.

The member 22 applies liquid to the filaments 20 before they are combined. Liquid supplied to the interior (chamber 60) of the member 22 leaves the passageway 62 as a short stream 69 (see FIG. 2) that contacts the speeding filaments 20 immediately above the filaments gathering location. Here the filaments 20 are in close proximity to each other. The filaments 20 carry liquid with them to the filament gathering location in the groove 56.

The individual glass filaments 20 are protected from abrasion by each other because the member 22 applied liquid to them before they are gathered into a bundle. Hence, the strand 26 is usually impregnated with the applied liquid.

In operation the member 22 applies an excess quantity of liquid to the filaments 20. Hence, as the filaments 20 abruptly change direction on the member 22, the mass of the coating liquid tends to cause some of the liquid to uncontrollaby separate from the filaments. Accordingly, the change in the path of the filaments 20, particularly at high speeds found in filament forming operations, tends to uncontrollably fling some coating substance from the filaments 20. But in practice, an excess quantity of liquid (and other coating substances) tends to remain on the filaments. Hence, the strand 26 normally leaves the member 22 with a greater amount of liquid or coating substance on it than the processed strand requires.

The arrows in FIG. 2 generally indicate some of the flow of air at the member 22. The plate 50 diverts impinging air across the speeding strand 26 to remove any excess liquid from the strand 26 as it leaves the member 22.

Hence the treatment assembly 24 uses the energy of air drawn by the filaments 20 to remove any excess or superfluous liquid from the advancing strand 26. The air deflector plate 50 changes the direction of travel of air moved by the filaments 20. In operation the plate 50 directs air flow generally transversely across the advancing strand 26 with sufficient energy to effect removal of any excess liquid from the strand 26. This is done in the immediate vicinity of the member 22.

As shown, the air deflector plate 50 is oriented oblique (not normal) to the direction of air movement from the filaments 20.

Air rushing down the plate 50 flows generally transversely across the strand 26 with sufficient energy to remove any unwanted or excess liquid from the strand 26. The container 52, which is on the other side of the strand 56 from the plate 50, receives liquid removed from the strand 26. The container 52 includes openings, such as the openings 68 for exhausting air flowing into the container 52 from the plate 50. These openings reduce air turbulence in the area of the member 22.

As indicated in FIG. 2 air hits against the upper regions of the member 22. Also, travel of the filaments 20 across the member tends to wipe off some of the air entrained with the filaments 20.

The air deflector plate 50 is movably mounted at the top edge of a vertically support member 70 by a hinge 71. The plate 50 is several inches wide and several inches in length as shown. A set screw 72 pierces the member 70 to contact the plate 50. An operator can change the location of the plate 50 (such as indicated by the dashed lines in FIG. 2) by turning the set screw 72 to move the plate upwardly in a clockwise direction or downwardly in a counterclockwise direction as viewed in FIG. 2. The position of the air deflector plate 50 controls the direction of air flow across the traveling strand 26.

Normally, the free end of the plate 50 is immediately adjacent the circumferential surface of the gathering member 22 and somewhat thereunder. Usually air effects removal of liquid from the strand 26 in a zone of from ½ to 2 inches after departure strand 26 from the member 22.

In operation, air from the plate 50 normally flows across the path of the moving strand 26 at an angle of intersection of from 30° to 90°. This angle is shown as angle B in FIG. 6. An angle B of about 45 degrees is preferred.

The apparatus of FIG. 1 returns liquid separated from the strand 26 to the member 22. As shown a line 80 carries liquid from the container 52 to a main supply container 82. A pump 84 in the container 82 moves liquid under pressure from the main supply container 82 through the supply tube 64 to the chamber 60 within the member 22.

Hence, the apparatus of FIG. 1 uses air moved by the advancing glass filaments 20 to remove any excess or superfluous liquid coating from strand 26. The plate 50 of the assembly 24 directs at least a portion of air moved downwardly by the filaments to flow generally transversely across the path of the strand 26. This air passes across the strand 26 with sufficient energy to remove any excess liquid.

The embodiment of FIG. 1 depicts air as the fluid media through which the filaments 20 (strand 26) travel. But it is believed that one can apply a coating substance of filaments 20 (and linear material generally) advancing through other fluid media. For example, one might use a liquid or gas other than air. Further, one can use other coating substances, including water only, or coating powders such as nylon and polyesters. One might even use two immiscible liquids, one liquid being the coating substance and the other liquid being the fluid media through which linear material is advanced.

FIG. 7 shows another embodiment of treating apparatus according to the principles of the invention. Here linear material 240 is passed lengthwise in a recess 246 in the outwardly curved turning surface 248 of a member 250. A nozzle 252 applies liquid to the linear material 240 during its advancement to the member 250. Hence, the linear material 240 traveling to the member 250 is wet.

The upper portion 254 of the member 250 is thin and immediately adjacent the surface of the advancing linear material. The member 250 changes the direction of movement of air entrained by the advancing linear material 240.

An air guide surface 260, which is opposite the turning surface 248, directs air moved by the linear material 240 to move laterally across the path of the linear material 240 leaving the member 264 to effect removal of any excess liquid from the linear material 240 leaving the memmber 250. Of course the material 240 must be moved sufficiently fast to provide air with energy to effect removal of excess liquid.

The arrows in FIG. 8 generally indicate the flow of air directed to move across the linear material 260.

FIG. 9 illustrates apparatus like the apparatus shown in FIG. 8. In FIG. 9, however, individual filaments 280 are gathered and turned on the member 250 to form a strand 282. And the nozzle 252 directs a spray of liquid onto the filaments 280 before they are gathered into the strand 282.

Figure 10:
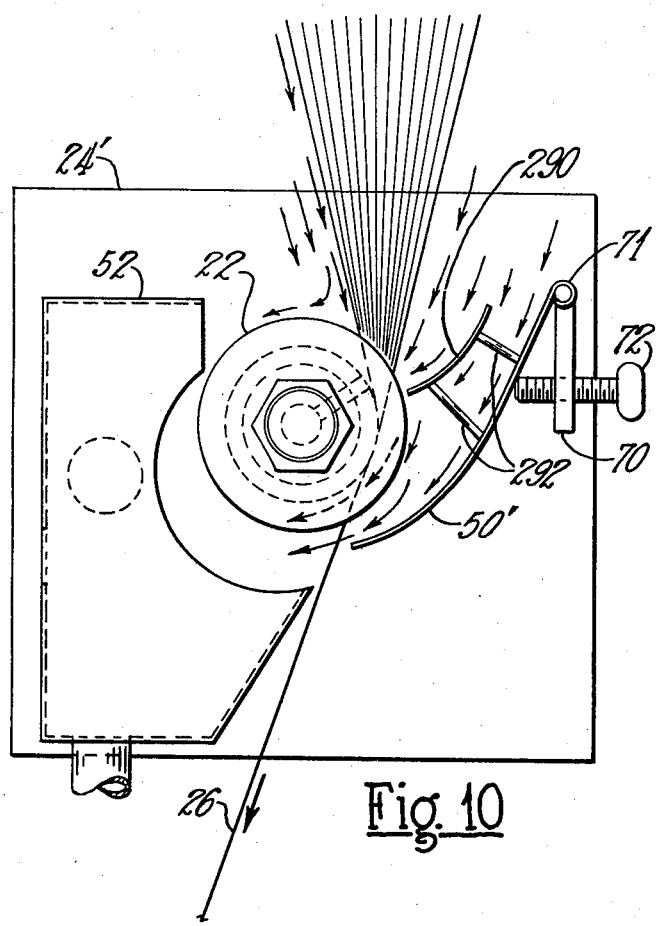
FIG. 10 is another treating assembly according to the principles of the invention.
Figure 11:
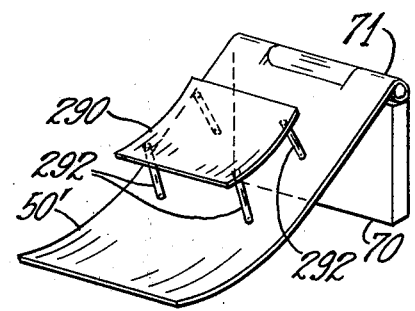
FIG. 11 is a perspective view of a portion of the assembly shown in FIG. 10.

FIGS. 10 and 11 illustrate apparatus for treating glass filaments 20 that is similar to the apparatus shown in FIGS. 1–6. However, the embodiment shown in FIG. 10 includes means for directing air against the circumferential surface of the member 22 in the zone liquid is applied to the filaments 20. As shown a curved plate 290 carried above and on a plate 50' by legs 292 diverts air moved by the filaments 20 towards the circumferential surface of the member 22 in the zone where liquid is applied to the closely grouped but still separated filaments 20.

The plate 50' is like the plate 50, but adapted to carry the plate 290.

The air diverted by the plate 290 promotes impregnation of the filament bundle with liquid and more uniform coating of liquid along the lengths of the filaments 20. In operation the diverted air by the plate 290 tends to surround the filaments 20 in the region the filaments are coming together into the filament bundle (strand 26). The energy of this air promotes penetration of the liquid within the gathering group of filaments 20.

The plates 50' and 290 are shown disposed in substantially parallel planes. But the disposition of the plate 290 can be modified as necessary to effect desired air flow against the filaments 20.

The plate 50' directs air across the traveling strand 26 as explained in relation to the plate 50.

We claim:

1. The method of treating glass filaments comprising: supplying streams of molten glass; withdrawing spaced apart continuous glass filaments from the streams; advancing the continuous glass filaments along converging paths to a gathering surface, the advancing filaments moving air with them; applying coating liquid to the filaments during advancement to the surface; gathering the advancing filaments into a linearly advancing strand by turning them on the surface; and removing any excess coating from the strand by impinging at least a portion of such moving air upon a deflecting surface located immediately adjacent, opposite and below the gathering surface, the deflecting surface being oriented in a position effective to deflect impinged air below the gathering surface in a direction generally transversely across the strand with sufficient energy to effect removal of excess liquid from the strand.

2. The method of treating glass filaments comprising: supplying streams of molten glass; attenuating the stream into spaced apart continuous glass filaments; advancing the continuous glass filaments along converging paths to a gathering surface, the filaments moving air in their directions of movement; applying coating liquid to the filaments during advancement to the surface; and removing excess coating from the strand by impinging at least a portion of the moving air upon a curved deflecting surface located immediately adjacent, opposite and below the gathering surface, the deflecting surface being in a downwardly disposed position effective to deflect impinged air below the gathering surface in a direction generally transversely across the strand with sufficient energy to remove excess liquid from the strand.

3. The method of treating glass filaments comprising: supplying streams of molten glass; withdrawing spaced apart continuous glass filaments from the streams; advancing the continuous glass filaments downwardly along paths converging at a gathering surface, the filaments moving air with them; applying coating liquid to the filaments during advancement to the surface; impinging a portion of the moving air upon a first deflecting surface located immediately adjacent and opposite the gathering surface in a downwardly disposed position effective to deflect impinged air towards the gathering surface at a zone in which the liquid is applied to the converging filaments to promote coating of the filaments with the liquid; and removing excess liquid from the strand by impinging another portion of the moving air upon a second deflecting surface located adjacent, opposite and below the gathering surface and below and spaced from the first deflecting surface, the second deflecting surface being oriented such that the moving air impinging the second deflecting surface is deflected below the gathering surface in a direction generally transversely across the strand with sufficient energy to effect removal of excess liquid from the strand.

4. Apparatus for treating filaments comprising: means for supplying streams of molten glass; means for withdrawing spaced apart continuous glass fiilaments from the streams, during such withdrawal the advancing filaments moving air in their direction of movement;

a member upon which the filaments are gathered into a strand located between the stream supply means and filament withdrawing means;

means for applying a coating substance to the filaments during their advancement to the member; and a deflecting surface loaded immediately adjacent, opposite and below the member in a disposition effective to be impinged by at least a portion of the air moved by advancement of the filaments and to deflect impinged air to move below the member generally transversely across the path of a strand as it leaves the gathering member with sufficient energy to effect removal of excess coating substances from the strand.

5. Apparatus for treating filaments comprising:
means for supplying streams of molten glass;
means for withdrawing downwardly spaced apart continuous glass filaments from the streams, during such withdrawal the advancing filaments moving air in their direction of movement;

a member upon which the filaments are gathered into a strand located between the stream supply means and filament withdrawing means;

means for applying a coating liquid to the filaments during their advancement to the member; and a curved deflecting surface located immediately adjacent, opposite and below the member so at least a portion of the air moved by advancement of the filaments is impinged on the member and diverted thereby to move generally transversely across the path of the strand below the member with sufficient energy to remove at least a portion of the excess liquid from the strand.

6. Apparatus for producing glass strand comprising:
means for supplying streams of molten glass;
means for downwardly withdrawing spaced apart continuous glass filaments from the streams, during advancement the filaments moving air with them;

a hollow disc-like member having a groove in its circumferential surface in which the filaments are gathered into a strand, such member having an opening from its interior to the atmosphere above the filament gathering region of the member in the groove and aligned with the converging filaments;

means for supplying liquid to the interior of the member under sufficient pressure to form a stream of liquid from the opening to engage the filaments at a zone immediately above the region of filament gathering; and a deflecting surface located immediately adjacent, opposite and below the hollow member so at least a portion of the air moved by advancement of the filaments is impinged on the member and thereby diverted to move generally transversely across the path of strand below the hollow member with sufficient energy to remove at least a portion of the excess liquid from the strand.

7. Apparatus of claim 6 further including a second deflecting surface spaced from and above the first deflecting surface and opposite the hollow member for being impinged by air moved by advancement of the filaments, such second surface being positioned such that air is deflected to move in a direction generally transversely of the filaments in the zone of liquid application thereto to promote liquid impregnation of the strand.

* * * * *